United States Patent
Cook et al.

(10) Patent No.: US 6,178,432 B1
(45) Date of Patent: *Jan. 23, 2001

(54) METHOD AND APPARATUS FOR CREATING INTERACTIVE WEB PAGE OBJECTS

(75) Inventors: William R. Cook, Palo Alto; Martin R. Gannholm, San Francisco, both of CA (US)

(73) Assignee: Informative Graphics Corp., Phoenix, AZ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/727,820

(22) Filed: Sep. 30, 1996

(51) Int. Cl.[7] .................................................. G06F 15/16
(52) U.S. Cl. ............................ 707/513; 707/501; 345/348
(58) Field of Search ...................................... 707/501, 512, 707/513, 514; 345/326, 329, 330, 335, 338, 348, 349

(56) References Cited

U.S. PATENT DOCUMENTS 5,708,826 * 1/1998 Ikeda et al. ............................ 707/501
5,724,595 * 3/1998 Gentner ................................. 707/501
5,727,156 * 3/1998 Herr-Hoyman et al. ........... 395/200.49

OTHER PUBLICATIONS

Meeker, "AnimNav.java Version 1.0.0", http://www.real-time.net/~elijah/old/jindex.htm, Jan. 4, 1996, pp. 1–14.*
"Graph", http://javaboutique.internet.com/Graph/, Sun Microsystems, Sep. 19, 1996, pp. 1–10.*
Klein, "TagArea", http://javaboutique.internet.com/TagArea/, Feb. 19, 1996, pp. 1–3.*
Kay, "animateButton", http://javaboutique.internet.com/animateButton/, Sep. 23, 1996, pp. 1–5.*

* cited by examiner

Primary Examiner—Stephen S. Hong
(74) Attorney, Agent, or Firm—Ritter, VanPelt & Yi LLP

(57) ABSTRACT

A system and method are disclosed for creating an interactive web page. A plurality of objects are defined which are configured to have associated states. The associated states include a visible state and a hidden state. An object in the visible state is displayed and an object in the hidden state is not displayed. Subsets of objects are associated together in structures so that the state of any object within the structure is dependent on the states of other objects within the structure. The plurality of objects and the structures are placed into an hierarchy in a way which causes certain objects and structures in the hierarchy to be layered on top of other objects and structures in the hierarchy. Behaviors are associated with the objects, and each behavior includes an associated event, an associated action, and an associated target object. Each behavior is arranged so that when the associated event occurs, the associated action is performed on the associated target object. The performance of the action on the target object changes the state of the target object, and the change of state of the target object is a second event. An event processor is provided which is configured to process the events as they occur and adjust the states of the objects according to the events and according to the behaviors associated with the objects so that the objects are displayed or hidden on the web page as events occur.

19 Claims, 14 Drawing Sheets

320—BACKGROUND GROUP
    321—LINE ($x_1$, $y_1$, ...) RECTANGLE ($X_1$, $Y_1$, ...)

322—ROBIN GROUP
    323—TEXT "ROBIN"
    324—BEHAVIOR: ENTER ROBIN REGION → SHOW
    326—BEHAVIOR: MOUSE CLICK → PLAY ROBIN GREETING

330—TOM GROUP
    332—TEXT "TOM"
    334—BEHAVIOR: MOUSE ENTER TOM REGION → SHOW TOM ANNOTATION
    336—BEHAVIOR: MOUSE CLICK → PLAY TOM GREETING

340—JILL GROUP
    342—TEXT "JILL"
    344—BEHAVIOR: ENTER JILL REGION → SHOW JILL ANNOTATION
    346—BEHAVIOR: MOUSE CLICK → PLAY JILL GREETING

350—ANNOTATION STACK
    351—BLANK ANNOTATION
    352—ROBIN ANNOTATION
    354—TOM ANNOTATION
    356—JILL ANNOTATION

360—GREETING SWITCH
    361—BLANK ITEM
    362—TOM GREETING SOUND
    364—ROBIN GREETING SOUND
    366—JILL GREETING SOUND

*FIG. 3B*

ON → PLAY SELF
OFF → STOP SELF
PLAY → CHANGE TO ON STATE
STOP → CHANGE TO OFF STATE

*FIG. 3C*

BEHAVIOR: CLICK → PLAY "FLUTTER" SOUND

706 — BUTTON GROUP
708 — TEXT
710 — FRAME
712 — BEHAVIOR: MOUSE CLICK → SHOW
714 — SHEET GROUP
740 — BUTTERFLY OBJECT
742 — BEHAVIOR: MOUSE CLICK → PLAY "FLUTTER
717 — BEHAVIOR: X
718 — WHITE BOX
720 — RIGHT SHADOW
722 — BOTTOM SHADOW
723 — BEHAVIOR CLICK → HIDE

METHOD AND APPARATUS FOR CREATING INTERACTIVE WEB PAGE OBJECTS

BACKGROUND OF THE INVENTION

The following invention relates generally to displaying pages of information on the WorldWide Web ("Web pages"), and specifically to creating interactive Web pages which include multimedia features.

Information is sent to users of the WorldWide Web via Web pages which contain information formatted in hypertext markup language ("HTML"). Users download and view HTML Web pages using a Web browser such as Netscape Corporation's Navigator or Microsoft's Internet Explorer. The pages are displayed one at a time on the user's computer screen. Further information about HTML and the WorldWide Web may be found in *The WorldWide Web Handbook* by Peter Flynn published by Thomson Computer Press © 1995, which is herein incorporated by reference. Objects on the pages are laid out two dimensionally, and cannot be overlapped. Each page can contain hypertext links to other pages available on the same web site or on different web sites. The process by which the information contained in Web pages is downloaded by the user's Web browser is called streaming. Often, information such as graphic information which is contained identically on several Web pages is cached by the user so that the information need not be downloaded repeatedly for each page, but instead may be accessed from the user's hard drive.

Caching of Web pages or information contained on Web pages saves considerable time in downloading pages and displaying them, but Web pages are still displayed one at a time. Each Web page can be associated with other Web pages, and it is possible to jump from one page to another Web page via an HTML link. It is not possible, however, for the user to change the information contained in or the appearance of a Web page. Furthermore, information from different web pages cannot be combined by the user in a single web page and rearranged. The user is limited when viewing one Web page to selecting HTML links which will cause the Web page being observed to stop being displayed and cause another Web page to be displayed. When the user selects an HTML link, then a file corresponding to the HTML link is loaded. If the file is an HTML page, then the page which is being displayed is removed from the screen, and the page which was selected by the hypertext link is displayed. The user is limited to browsing among web pages, clicking on links, and loading files. The user's ability to interact with the pages and to combine or associate information from the pages is limited compared to the user's ability to manipulate files and objects on his own computer using a desktop interface. Because the objects displayed on a single web page do not change in response to interaction with the user, the manner in which information can be presented on a Web page is limited.

Javascript provides a way to include programs with the objects which are downloaded in a Web page, enabling the user to change some page properties. More information about Javascript and the Java programming language may be found in *Java in a Nutshell* by David Flanagan, published by O'Reilly & Associates ©1996. Javascript allows the user to change the file associated with an image tag or to write additional HTML at the end of the document. This capability does not, however give the user the ability to manipulate images on the screen. An image tag in HTML is specified to cover a certain area of the page and is associated with an image file that is displayed in that area. Changing the file associated with the image tag has an effect which is limited to displaying a different image in that same area. The image cannot be moved, resized, overlapped, or combined with other images. Furthermore, a different type of file, such as a text file or a shape file cannot be inserted into the area. Additional HTML objects may be added at the end of the Web page, but those additional objects must be added only at the end of the page and cannot be otherwise arranged or intermingled with previously existing objects on the page.

If a Web page designer desires to otherwise change or modify the information displayed in a Web page based on interaction with the user, the designer is currently limited to stopping the display of the current page and replacing it with another page. HTML allows one bit map background image, which is repeated to fill the entire page. The "foreground" consists of a collection of text and images which are "laid out" next to each other according to the "tags" in the HTML document. The objects may not overlap. Objects may have a link, which may be a uniform resource location ("URL"), which is the name of an "anchor" within the same file to jump to, or the name of another file. Clicking on the link causes the associated file to load. If the file is a sound file, then it plays, and if the file is an HTML page, then the HTML page is loaded and replaces the previous page. This is limiting because in many instances, the Web page designer may desire to have information pop out of the Web page or be highlighted or enlarged on the Web page, while leaving the other information in the Web page on the display. This is, of course, possible by simply replacing the page with other pages which represent modified versions of the page, but this method of modifying a page is cumbersome and ineffective to animate the page.

These limitations on the display of Web pages are especially noticeable to the multimedia user. It is possible, for instance, to play a sound in response to the pressing of a button or selection of text by the user of a Web page, but the appearance of the page cannot be altered in connection with the playing of the sound without removing the page from the display and displaying a new page. Furthermore, when a video clip or animation is desired to be played from a Web page, the Web page must include a two dimensional space which is made available for a second application to play the movie or animation. The animation cannot pop up on the page and temporarily overlap other objects or spaces on the page. It would be desirable if the space for the video clip or animation could simply appear on the page when needed and disappear when finished. It would also be desirable if a movie or animation could be displayed in the space directly by the Web browser without needing to access a separate application for playing the movie or animation.

What is needed is a way to modify and animate the information displayed on a single Web page without removing that page from the display and substituting another Web page. Freed from the constraint of the need to design and display separate pages for each change which is to be displayed, a designer could animate Web pages and make them interact with the user.

SUMMARY OF THE INVENTION

Accordingly, the present invention provides a system and method for selectively displaying, moving, and hiding various objects on a single Web page. The present invention includes layering of objects, dynamic loading of additional objects onto the currently showing page, and behaviors for objects which are more sophisticated than clicking on objects to load files. The Web page interacts with the user by responding to user input such as movement of the mouse into different regions occupied by the objects and the user pressing or releasing the mouse button in those regions. Web pages created using the present invention are more dynamic and interactive than current Web pages because the designer of the Web page is not limited to simply sending the user other Web pages upon the selection of an HTML link. Movement of the mouse into or selection of different areas on the page causes various objects defined by the designer to appear, to be played, or to become hidden. Different objects may be layered on top of other objects in a stack. Objects may also be displayed together as groups or organized together into a switch so that only one object at a time has a certain state.

In one embodiment, a system and method are provided for creating an interactive web page. A plurality of objects are defined which are configured to have associated states. The associated states include a visible state and a hidden state. An object in the visible state is displayed and an object in the hidden state is not displayed. Subsets of objects are associated together in structures so that the state of any object within the structure is dependent on the states of other objects within the structure. The plurality of objects and the structures are placed into an hierarchy in a way which causes certain objects and structures in the hierarchy to be layered on top of other objects and structures in the hierarchy. Behaviors are associated with the objects, and each behavior includes an associated event, an associated action, and an associated target object. Each behavior is arranged so that when the associated event occurs, the associated action is performed on the associated target object. The performance of the action on the target object changes the state of the target object, and the change of state of the target object is a second event. An event processor is provided which is configured to process the events as they occur and adjust the states of the objects according to the events and according to the behaviors associated with the objects so that the objects are displayed or hidden on the web page as events occur.

These and other features and advantages of the present invention will be presented in more detail in the following specification of the invention and the figures.

BRIEF DESCRIPTION OF THE DRAWINGS

FIG. 3B illustrates a hierarchical structured object list which is included in the data file which is associated with the organization chart of FIG. 3A and which defines the interaction of the objects with the user.

FIG. 3C depicts how a one to one correspondence is implemented in one embodiment.

DETAILED DESCRIPTION OF THE INVENTION

Figure 1A:
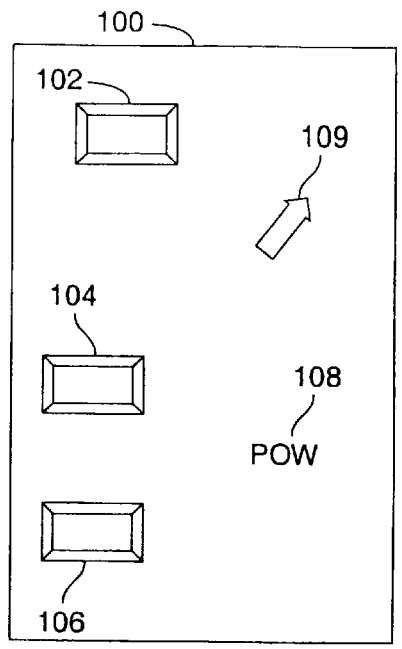
FIG. 1A illustrates a Web page which includes multimedia objects which may be either displayed or hidden based on the interaction of a user with the Web page.
Figure 1B:
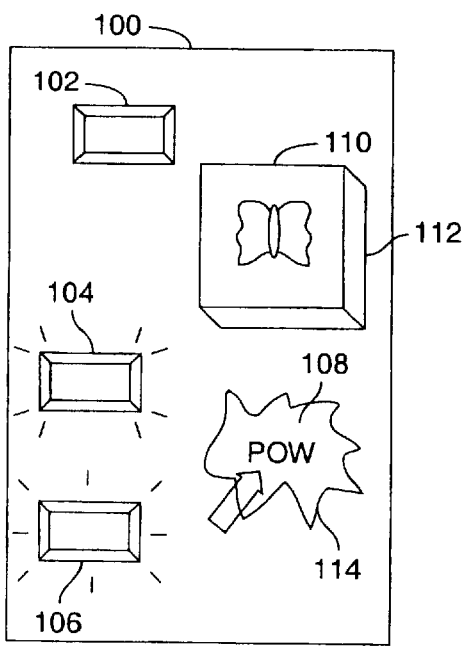
FIG. 1B illustrates a Web page after a user has activated various interactive multimedia features.

FIG. 1A illustrates a Web page 100 which includes multimedia objects which may be either displayed or hidden based on the interaction of a user with Web page 100. Web page 100 is shown on the left before the user has activated the interactive features. Web page 100 includes button 102, button 104, button 106, and text 108. FIG. 1B illustrates Web page 100 after a user has activated various interactive multimedia features. In one embodiment, a user activates the multimedia features by moving a mouse pointer 109 to different regions of Web page 100 and manipulating the mouse button. In other embodiments, a touch screen is used. Any other form of input device such as a joystick or keyboard which enables the user to navigate around Web page 100 and make selections may also be used.

The selection of button 102 by clicking the mouse on the region of the screen occupied by button 102 has caused picture 110 which includes shaded border 112 to appear in a space which was formerly blank. If the space in which picture 110 appears contained other objects prior to the display of picture 110, then the Web page creator can choose to display picture 110 on top of objects already displayed so that picture 110 partially or fully obscures such objects, to hide the objects upon the display of picture 110, or to cause picture 110 to be displayed on a layer below the objects. Additionally, picture 110 may appear to be wholly or partially transparent or translucent, and picture 110 may alter the appearance of the objects which are displayed before picture 110 is activated. As a result of the user selecting and dragging button 104, button 104 has moved downward, changed color, and begun to flash. As a result of the user selecting button 106, a series of lines have been displayed around button 106, and sound is also being played. When the user moves mouser pointer 109 into the region occupied by text 108, a starburst graphic 114 is displayed behind text 108 so that text 108 is not obscured and occupies a layer on top of starburst graphic 114. Each of the above enhancements to the Web page occur as result of an interaction with the user and do not require the separate display of an additional page. The enhancements are created and produced as part of a single Web page.

Figure 2A:
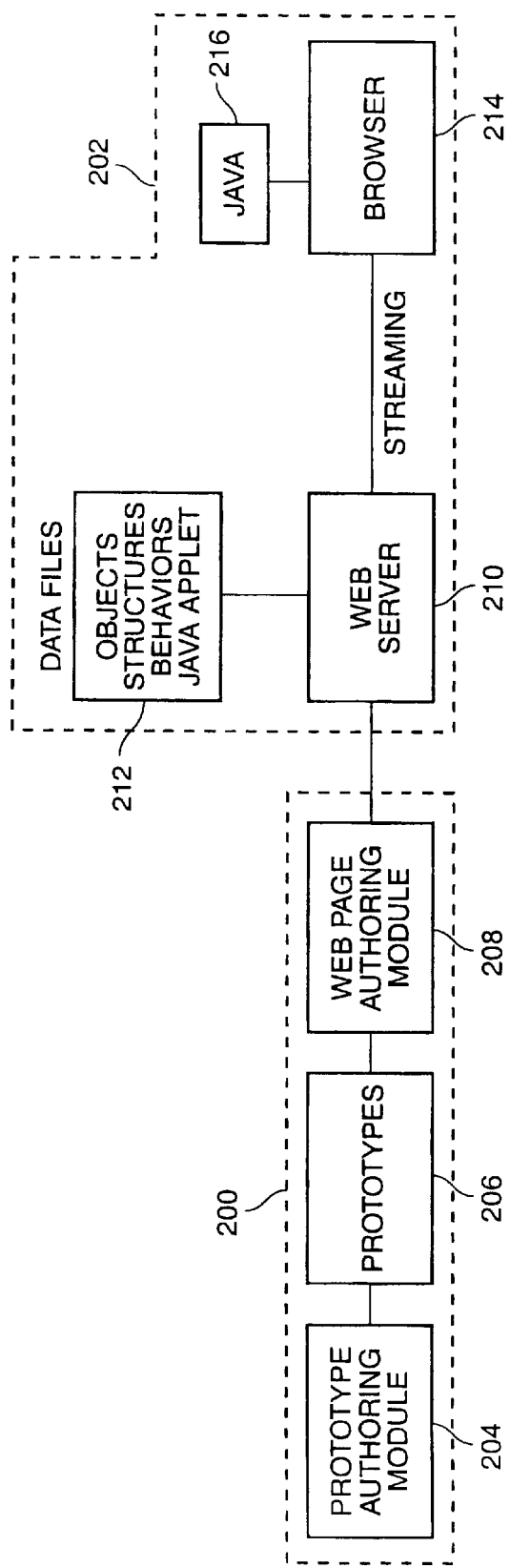
FIG. 2A illustrates in block diagram form a system for creating and displaying a Web page.

FIG. 2A illustrates in block diagram form a system for creating and displaying a Web page such as Web page 100 displayed in FIG. 1 and FIG. 1A. FIG. 2A is divided into two systems. Authoring system 200 creates the objects, structures, and behaviors which make up an interactive Web page. Delivery system 202 delivers the interactive Web page to a user and modifies the appearance of the Web page according to user input.

In one embodiment, authoring system 200 includes a prototype authoring module 204, which creates a set of prototypes 206. The prototypes 206 are user by Web page authoring module 208. In one embodiment, prototype authoring module 204 is referred to as NET-IT™ Live!. NET-IT Live! enables an author to define prototypes which are objects or groups of objects which are associated together. Objects may include text, images, shapes, or sounds. The prototype author selects and arranges various objects together to define a prototype. Some prototypes contain a place holder which can be bound to an object which is selected by a Web page creator who is using Web page authoring module 208. Prototype authoring module 204 thus enables a prototype creator to define prototypes which consist of objects, including a placeholder object.

When the Web page creator attaches a prototype to an object, then the prototype "wraps around" the object and the object is inserted into or "bound" to the placeholder so that a combination of the prototype and the bound object is created. This combination includes all of the objects and behaviors included in the prototype and the bound object. In the embodiment shown, prototypes are created first and Web pages are created from the prototypes. In other embodiments, Web pages are created directly by defining and selecting objects. It should be appreciated that whenever an action is described as being accomplished by prototype authoring module 204, the same action could alternatively be accomplished directly by the Web page author. The use of the prototypes makes Web page creation a faster, more high level process for the user who has a library of prototypes created by prototype authoring module 204. The definition of prototypes by prototype authoring module 204 is somewhat more complicated than the use of the prototypes to define an interactive Web page. In certain embodiments, the Web page author is not provided with prototype authoring module 204, but is only provided a set of prototypes 206. The Web page author makes selections from the prototypes and attaches the prototype to user-defined objects.

Objects are organized into structures which include groups, stacks, and switches. A group is a collection of objects which are all displayed or hidden together. A stack is a group of objects which are displayed one at a time so that when one of the objects in the stack is displayed, all of the other objects are hidden. A switch is a set of objects which are organized so that only one of the objects is in a given state. In one embodiment, the state is the state of being on or off. A "build" structure is also defined in certain embodiments. A build structure has the property that all of the items contained in it are shown up to the current item and all items after the current item are hidden. Prototype authoring module 204 also determines a set of behaviors for the objects included in the prototype. A behavior includes an event, an action, and a target object arranged so that when the event occurs the action is directed on the target object. Events are defined as certain state changes of objects or user input actions such as a mouse click. For example, when a mouse click occurs within the area defined for an object on the screen, then any behavior contained in that object which is defined to occur in the event of a mouse click will be found and the action defined for that behavior will be executed on the target object.

Web page authoring module 208 is the product which enables a user to select and manipulate prototypes and to bind objects to those prototypes. In one embodiment, the Web page authoring module 208 is referred to as NET-IT™ Now!. Prototypes are used to add interactive behavior to a web page. By selecting and arranging prototypes and attaching the prototypes to objects, a user is able to specify an interactive Web page. Once the interactive page is defined, the files associated with the page are stored on and distributed by Web server 210. Web server 210 includes data storage 212 which stores the files associated with the interactive Web page including objects and structures and their behaviors, and a Java® applet which is used to selectively display the objects based on the occurrence of certain events including user input events. The data files stored in data storage 212 are not organized as a series of variations of an interactive Web page which are themselves Web pages. Instead, data storage 212 stores the content of an interactive Web page as a series of objects and structures which may be displayed at different times according to their behaviors which depend on events. Data storage 212 also includes a Java applet which controls the displaying and hiding of objects upon the occurrence of events. Browser 214 downloads the objects and structures and their behaviors and the Java applet which is included in data storage 212 through a process which is know as streaming. Browser 214 also includes a Java run-time environment and libraries 216 which enables the browser to run the Java applet downloaded from data storage 212. The Java applet manages the display of objects and the interaction of the user with the objects and structures downloaded from data storage 212.

Figure 2B:
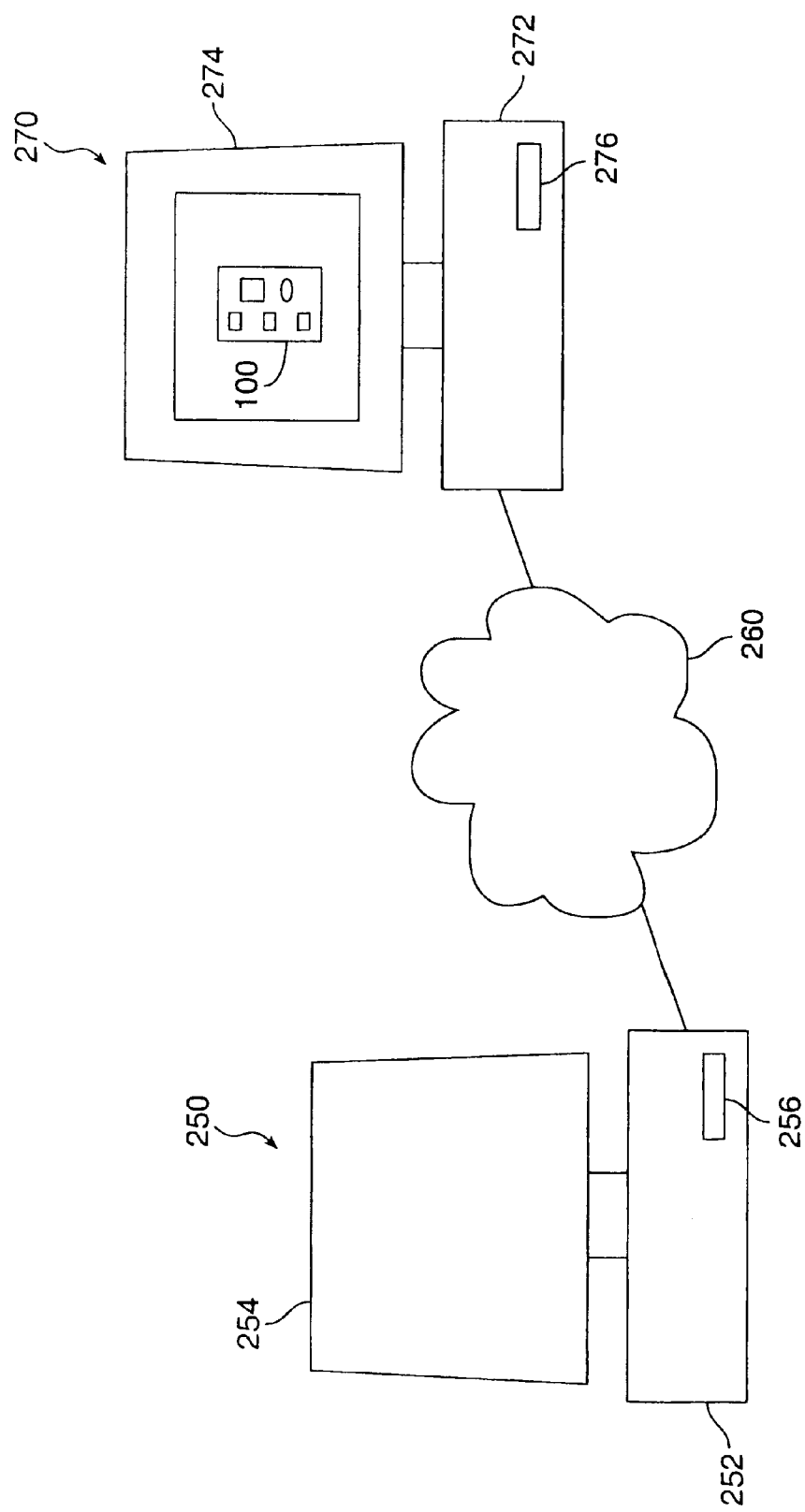
FIG. 2B depicts a hardware setup used in one embodiment of the present invention.

FIG. 2B depicts a hardware setup used in one embodiment of the present invention. Computer 250 includes a processing unit 252 and monitor 254. Processing unit 252 is connected to storage unit 256. Modules 204 and Web page authoring module 208 are stored on storage unit 256. If the user is defining his own prototypes 206, then the user designs them using prototype authoring module 204 and stores them on storage unit 256. If the user is using pre-defined prototypes already stored on storage unit 256, then the user simply accesses them using processing unit 252 to create data storage 212. In the embodiment shown, prototype authoring module 204 and Web page authoring module 208 are implemented on the same computer. In other embodiments, prototype authoring module 204 creates prototypes 206 on a different computer and Web page authoring module 208 receives prototypes 206 via the internet. Data storage 212 is then stored on storage unit 256 so that computer 250 may function as Web server 210. In other embodiments, Web server 210 and Web page authoring module 208 are implemented on different computer. In general, it is a feature of the present invention that prototype authoring module 204, Web page authoring module 208, and Web server 210 may all be implemented on a single computer, or may individually be implemented in any combination on separate computers connected by the Internet or other network.

Computer 250 is connected to the Internet 260, as is computer 270. Computer 270 includes processing unit 272 and monitor 274. Web page 100 is shown displayed on monitor 274. Processing unit 272 is also connected to storage unit 276. Java runtime environment and libraries 216 and a Web browser is also stored on storage unit 276. In other embodiments, Java run-time environment and libraries 216 and the Web browser are split. For example, on certain very small "web devices," the Java may run on an intermediate server. Data storage 212 are transferred from storage unit 256 to storage unit 276 via Internet 260 using a standard streaming process. This process is described in the HTTP and the HTTPS documentation, which are herein incorporated by reference. Once data storage 212 are transferred to storage unit 276, processing unit 272 causes Web page 100 to be displayed on monitor 274 using a Java applet received from computer 250 as part of data storage 212.

Figure 3A:
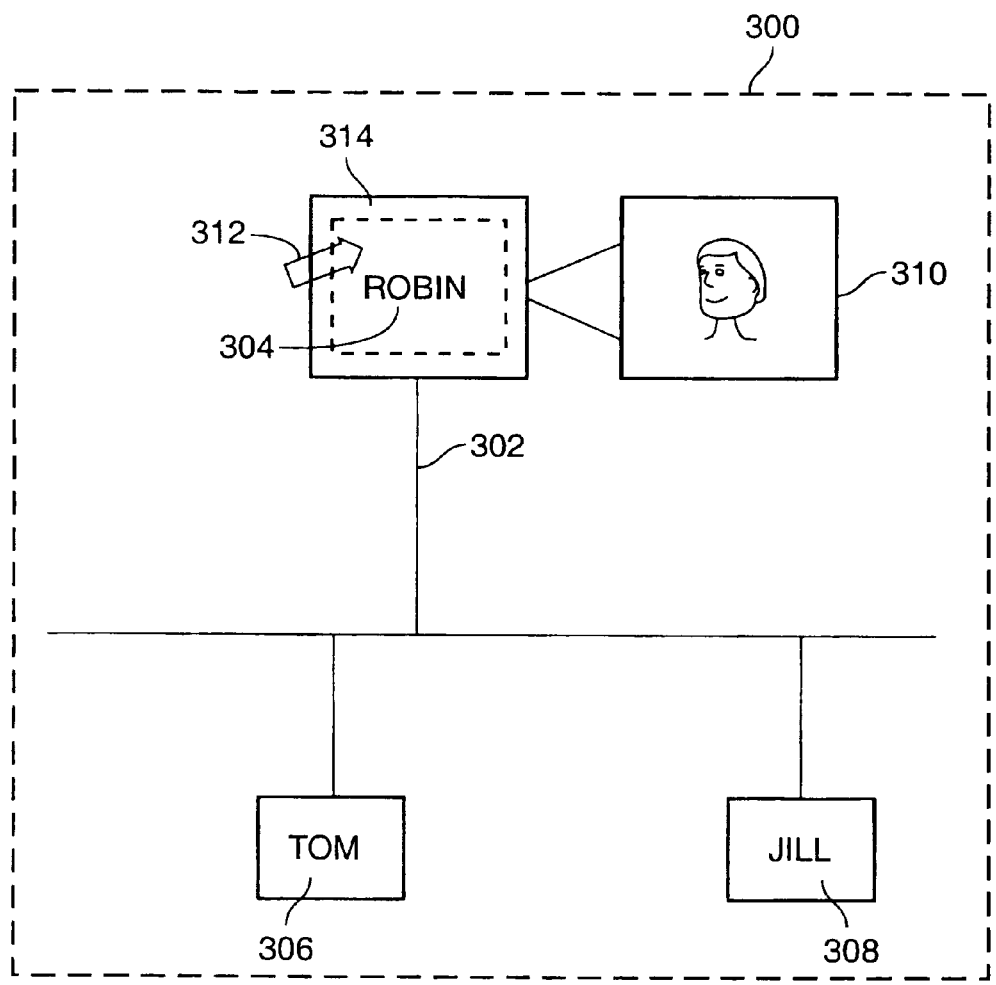
FIG. 3A illustrates an example of an object view of an organizational chart which is interactive according to the present invention.

FIG. 3A illustrates an example of an object view of an organizational chart 300 which is interactive according to the present invention. Organizational chart 300 includes a frame 302, a Robin group 304, a Tom group 306, and a Jill group 308. Annotation 310 consists of a photograph. Annotation 310 is displayed when a user moves a mouse pointer 312 into a region 314 surrounding Robin group 304. A greeting sound, which is not shown, is played when the user clicks the mouse button while mouse pointer 312 is in region 314. FIG. 3B illustrates a hierarchical structured object list which is included in the data file which is associated with the organization chart of FIG. 3A, and which defines the interaction of the objects with the user.

Background group 320 is listed first and consists of the lines and rectangles which make up the frame 302 of organizational chart 300. Background group 320 is referred to as a background group because it appears on the bottom layer of the display and so is always in the background. In the embodiment shown, structures and objects are hierarchically organized in back to front order, so that objects which appear on the lower layers are listed first and objects which appear on upper layers are listed last.

Background group 320 is listed first in the list and so is displayed on the bottom layer. In other embodiments, the layering is not defined by the ordering of the structures and objects, but is instead defined by an explicit "layer number" assigned to each object. Thus, different objects in the same stack may be placed in different layers. Background group 320 includes a series of shape objects 321. Background group 320 is a group structure because all of the objects which are included in background group 320 are either made visible together or hidden together. Each line and rectangle included as a shape object in the series of shape objects 321 is defined with sufficient points to describe its location and size. Any format available to one of ordinary skill in the art of defining such shape elements in a drawing may be used. In one embodiment, graphics metafiles are used as the file format for shapes. It should be appreciated that other formats could equivalently be used. In general, objects in the hierarchical structured object list include properties which specify the position and, if necessary, the orientation of the object. These properties are not shown in the hierarchical structured object list for the sake of simplicity, but it should be understood that such properties are defined for objects so that a position is specified for the object which corresponds to the position of the object shown in the object view.

A Robin group 322 is defined next. The purpose of Robin group 322 is to display the name "Robin" on the chart and also to contain the behaviors that will occur when the user moves mouse pointer 312 into region 314 or clicks the mouse when mouse pointer 312 is in region 314. Because Robin group 322 is defined after background group 320 in the described embodiment, it will appear on top of background group 320. Robin group 322 consists first of the "Robin" text object 323. Robin group 322 also includes two behaviors. Each behavior includes an event, an action and a target. For a first behavior 324, the event is the mouse entering a region defined of the screen. In one embodiment, the Robin region is defined by four points which represent the four corners of a rectangle. Other methods of defining a region may be used as well. The action specified is to show the target, which in this case is the Robin annotation described below. A behavior 326 is also defined with the event being a mouse click within the Robin region. Upon the occurrence of that event, the action is to play the target which is the Robin greeting defined below. In the example shown, all defined behaviors are contained in structures which contain objects. It should be noted that behaviors may also be contained in objects. In general, whenever groups or objects are mentioned or referred to as being searched or otherwise operated on, it should be understood that either objects or groups or both objects and groups are intended to be included.

Similarly, a Tom group 330 includes a "Tom" text object 332, a behavior 334 and a behavior 336. Upon the occurrence of the event of mouse pointer 312 entering the Tom region, behavior 334 shows the Tom annotation. Upon the occurrence of the event of the mouse clicking while positioned in the Tom region, behavior 336 causes the Tom greeting to be played. Jill group 340 also includes a "Jill" text object 342, a behavior 344, and a behavior 346.

The various annotation objects are organized into an annotations stack 350. In one embodiment, the annotations are picture files which include bit maps of photographs using the JPEG format. It should be appreciated that other formats could equivalently be used. Because it is a stack, annotations stack 350 ensures that only one of the annotations is showing at any given time. A blank annotation 351 is provided for the time before mouse pointer 312 has moved into any of the regions defined for the various groups. Because blank annotations 351 is the first element in the stack, it is visible when the system is initialized and remains visible until another element becomes visible. Also included in annotations stack 350 are a Robin annotation 352, a Tom annotation 354, and a Jill annotation 356 each include a photo of Robin, Tom, and Jill respectively. As the mouse moves from one region to another region, the organization of the annotation objects into the stack structure ensures that the showing or playing of one annotation causes all of the other annotations to disappear. In the embodiment shown, no annotation (i.e. the blank annotation object) is shown initially and once one annotation appears, it remains visible until mouse pointer 312 moves into another box on the organizational chart which corresponds to a defined group. If a blank group had been defined with a behavior to make visible blank annotations 351 upon mouse pointer 312 moving to a region defined as all of the space around the regions corresponding to Robin group 322, Tom group 330, and 340, then each annotation would disappear once mouse pointer 312 left its region and no annotation (i.e. the blank annotation object) would appear until mouse pointer 312 moved into another annotation region.

The greetings are organized into a greeting switch structure 360 which ensures that only one greeting is played at a time by ensuring that only one greeting is on at a time. A one to one correspondence is set up between the state of being on and the greeting playing. FIG. 3C depicts how the one to one correspondence is implemented in one embodiment. A set of behaviors are defined for each greeting object such so that when the greeting object assumes the on state (the event) the greeting object plays (the action) itself (the target) and when the greeting object is in the off state, then the greeting object stops itself. When the greeting object is played, it automatically changes to the on state and when the greeting object is stopped, it changes to the off state.

The greeting switch structure ensures that only one of the defined greeting objects is on at any given time, and if no greeting is being played, then a blank greeting object 361 is turned on. A Tom greeting 362, a Robin greeting 364, and a Jill greeting 366 each includes the set of four behaviors which ensures a one to one correspondence between the on state the sound playing. In one embodiment, the greetings are sound files using the mu-lau format. It should be appreciated that other formats could equivalently be used.

A number of special actions are defined which may be performed on stacks or switches as targets. These actions directly control which element of a switch is the active element or which element of a stack is displayed. These actions are first, last, next, and previous. First makes the first element the active or displayed element; last makes the last element the active or displayed element ; next makes the next element the active or displayed element; and previous makes the previous element the active or displayed element. These special actions are often included in behaviors that are contained in groups which also include button objects that display the first, last, next, and previous selections. The appropriate action occurs when the user clicks on the correct button. The processing of any of these actions by a stack or switch may trigger a state change for the stack or switch so that the stack or switch is changed to a special state of having a first or last element active. The existence of the stack or switch in that special state in turn may trigger other actions defined in behaviors contained in structures or objects.

By specifying objects; organizing the objects into structures such as stacks, switches, and groups; organizing the structures in a back to front/background to foreground order; and including behaviors which are defined for objects or structures, the behavior of the interactive Web page is completely defined to create the interactive organizational chart 300. Once each structure, group and behavior is downloaded by the user, all of the information required to dynamically change the Web page is possessed by the user and all that is required in order to play the interactive Web page is the Java applet which is configured to monitor events and implement the various behaviors of the objects and structures in response to the events so that the proper objects are played and hidden at the proper times.

Figure 4A:
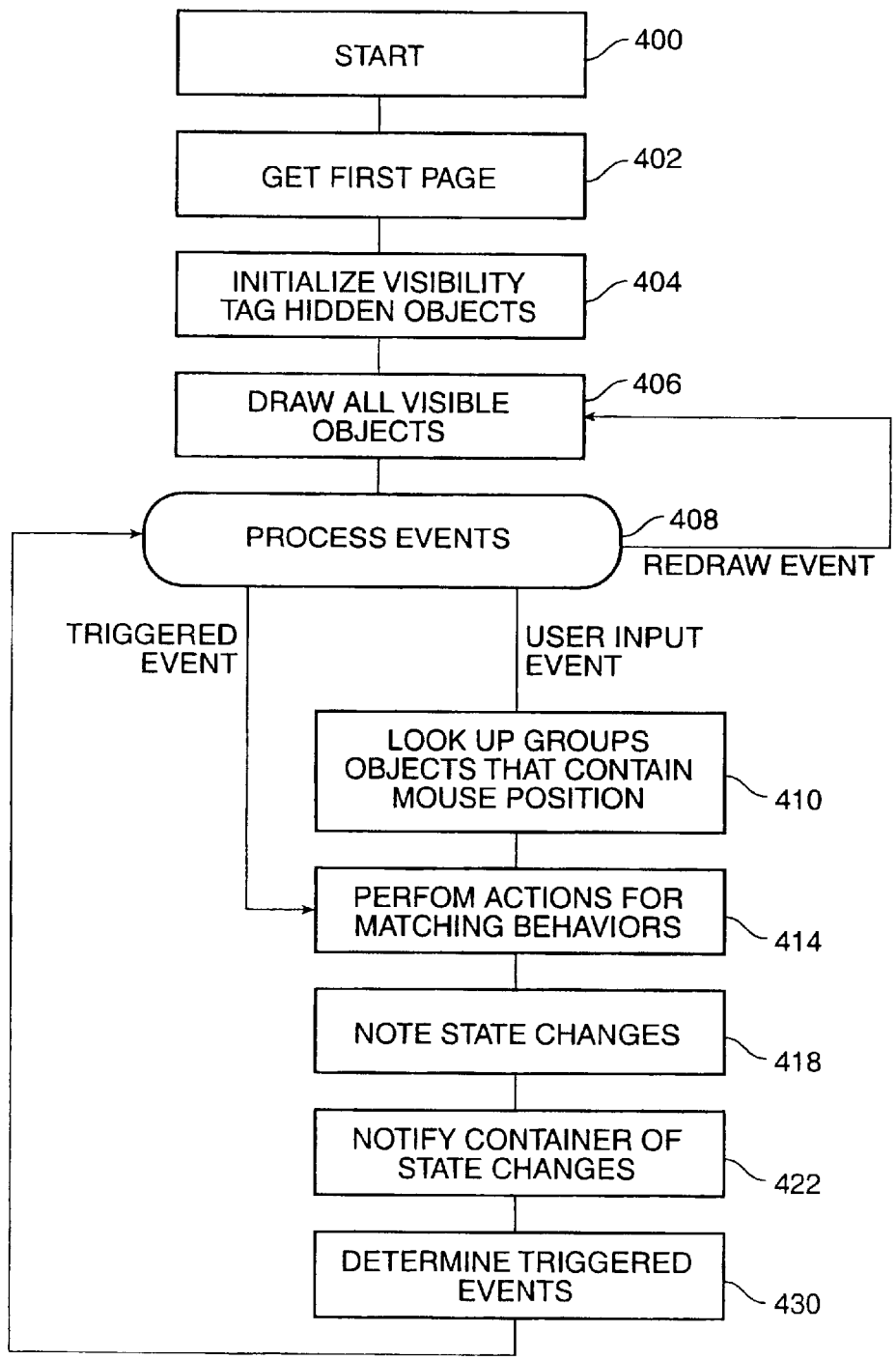
FIG. 4A is a flow diagram which illustrates a process which is executed by a Java applet downloaded by a user from a Web server in order to display and interact with an interactive Web page.

FIG. 4A is a flow diagram which illustrates a process which is executed by a Java applet downloaded by a user from Web server 210 in order to display and interact with an interactive Web page. The Java applet displays the objects according to the rules implicit in their defined structures and performs the actions specified in the behaviors on the targets upon the occurrence of the events specified in the behaviors. The actions implemented include primitive actions such as showing, hiding, or playing objects as well as actions which cause state changes in objects and notification actions which occur automatically as a result of the inclusion of an object within certain structures such as stacks or switches. Actions which cause state changes often trigger other actions which are referred to as "triggered actions." Triggered actions are defined by behaviors so that they occur in response to state changes or other events which are caused indirectly by behaviors of objects instead of being caused directly by actions of the user.

The process starts at step 400 and in step 402, the applet gets the first "page". The "page" is not a standard Web page but is instead a set of objects and/or structures which include behaviors. These objects and structures are not grouped together in order to be displayed simultaneously on a single web page, but are instead grouped together to be displayed interactively on an interactive "page" in response to input events caused by the user. In step 404, the applet initializes the visibility of each object. Objects which are to be hidden are tagged as hidden. For example, every object in each stack except for the first object is tagged as hidden. All visible objects are drawn in step 406. Visible objects are said to be "drawn" when they are bit mapped onto the display. In other embodiments, displays which are not bit mapped displays are used. In such embodiments, visible objects are drawn when they are presented on the display. In general, objects are described as being either "drawn" or "displayed" when they are made visible (i.e. not tagged as being hidden). Objects which are drawn are also referred to as being "played." Being "played" is a more general term which refers to shape objects and other multimedia objects such as sound objects which become active. Next, the applet enters a state 408 in which it waits for events and processes those events as they occur.

A redraw event is a special event which is generated by the system. The screen bit map is regenerated from the objects which are visible. Upon the occurrence of a redraw event, control is transferred to step 406 and all visible objects, that is all objects which are not tagged as hidden, are redrawn. Control is then transferred back to state 408 and the system waits for other events.

If the event is a user input event, then the applet must determine the objects which contain behaviors that will be triggered by the event. In one embodiment, the user input device is a mouse and so the applet will look up all objects that contain the mouse position which is associated with the user input event in step 410. Events involving the mouse may include any movement of the mouse, the pressing of the mouse button ("mouse down"), the releasing of the mouse button ("mouse up"), a combination of a mouse down and a mouse up ("mouse click"), or any combination or sequence of mouse clicks. Special drag and drop events which also involve the mouse include the beginning of a drag ("drag start"), the ending of a drag ("drag end") and a drop. In some embodiments, the mouse has several buttons and an additional set of mouse events is defined for each button.

Once the applet has determined all the objects that contain the mouse position in step 410, the applet performs in step 414 all actions which are specified by behaviors which match the particular mouse event that occurred. In step 418, the applet notes any state changes caused by the actions performed. In step 422, the applet notifies any structures of state changes of objects in that structure. In step 430, the events which are triggered by the state changes noted in step 418 or by state changes that occurred in the containers which were notified in step 422 or elements in those containers are determined and control is transferred to state 408 where the triggered events are processed. In one embodiment, when such a triggered event occurs, control is transferred directly from state 408 to step 414 since step 410, looking up the objects which contain the mouse position, is not necessary for triggered events.

Triggered events are caused by state changes that occur when an action is performed on an object. Actions are performed on objects as a result of behaviors and as a result of the structure in which an object is contained (the object's "container"). As described above, actions are performed on target objects as a result of behaviors which each contain an event, an action, and a target. The action is performed on the target object when the event occurs. The event defined for each behavior is also referred to as the triggering event for that behavior, since the behavior's action is performed on the target object when the event occurs. Actions are also performed on objects in containers when a container is notified of a state change in one of its elements.

Therefore, when an object changes state, that state change may trigger numerous events. When the object changes state, the object's container is notified, causing the container to perform actions on the other objects which it contains. Other events are triggered by any behaviors which include the state change of the objects as a triggering event. A "tree" of triggered events may occur as a result of one state change since each event in the set of events triggered by the state change may be a state change which in turn triggers other sets of events.

In one embodiment, the efficiency of the applet is increased by the fact that no search through all of the objects is needed to find all of the behaviors which contain a triggering event that matches the state change which occurred. All of the behaviors which contain a state change of a given object as the triggering event are contained in that object. Therefore, when a state change occurs, all triggered events caused by behaviors are found by searching only the behaviors of the object which changed state. No other search is necessary because no other objects contain behaviors for which the triggering event is the state change of the object. In other embodiments, this constraint that an object may not include a behavior which contains a triggering events which is a state change of another object is not imposed. Objects are allowed to include behaviors which contain triggering events which are state changes in other objects. In such embodiments, it is necessary to search the behaviors of all objects to determine the triggered events when any object changes state.

Figure 4B:
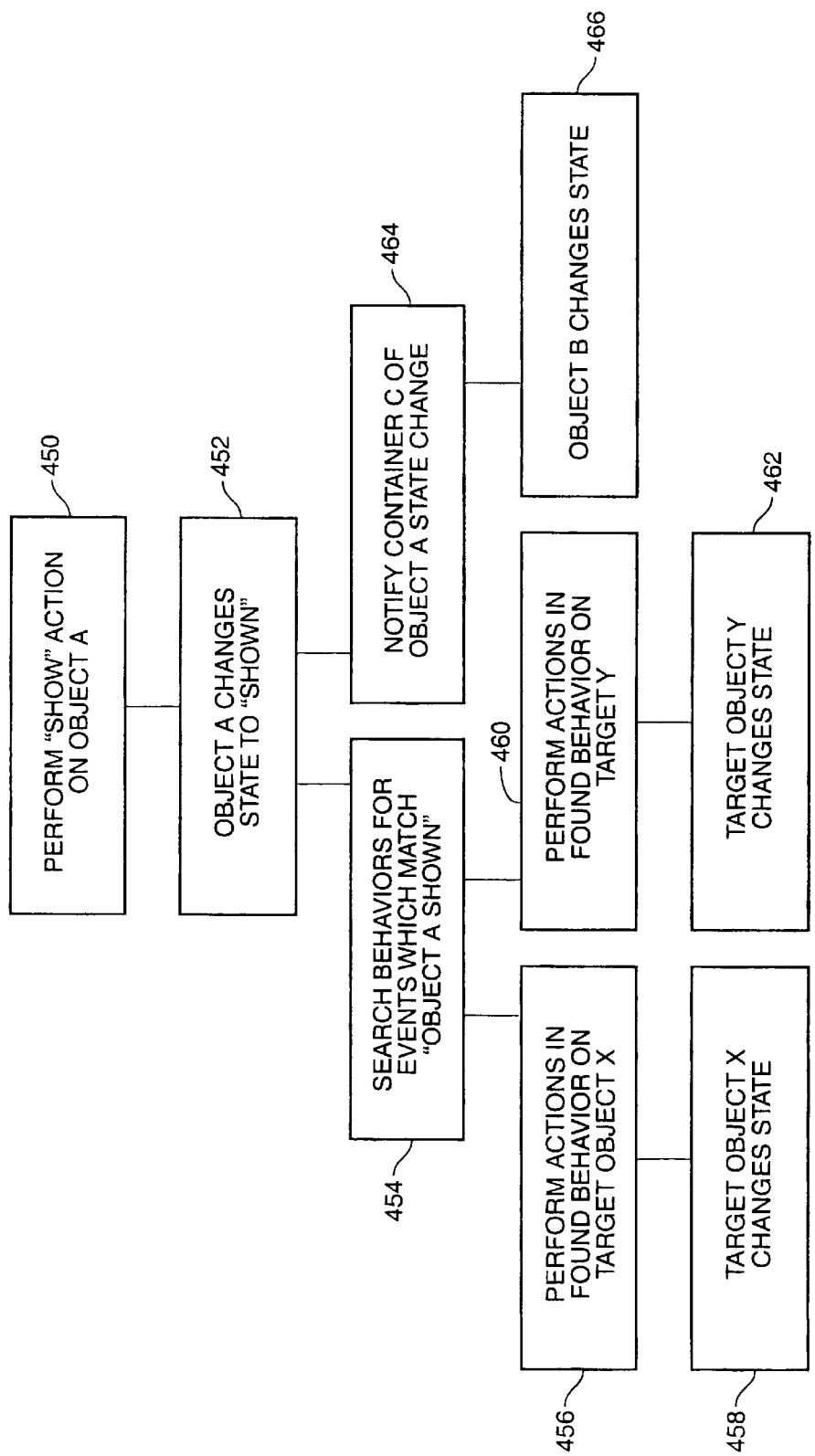
FIG. 4B is a block diagram which illustrates how a tree of triggered events occurs when object A, which is in stack container C along with object B, changes state from "hidden" to "shown."

FIG. 4B is a block diagram which illustrates how a tree of triggered events occurs when object A, which is in stack container C along with object B, changes state from "hidden" to "shown." In block 450, the action "show" is performed on object A. Object A changes state to "shown" in block 452. In block 454, behaviors are searched for events which match the event, "object A shown." In block 456, an action in a found behavior is performed on its target object X and target object X changes state in block 458. In block 460, an action in a found behavior is performed on its target object Y and target object Y changes state in block 462. In block 464, container C is notified of A's change of state. In block 466, the container changes the state of object B. Thus, A's change of state triggers state changes in objects B, X, and Y. The state changes in B, X, and Y are each triggered events which may themselves trigger other events. All such triggered events are determined and processed by the applet.

It should be noted that triggered events may occur simultaneously to or interspersed between new user input events or redraw events. Different embodiment of the invention prioritize the processing of events in different manners. Generally, it is not critical which events take priority. In one embodiment, system redraw events are given the highest priority and are executed as they occur with each object being displayed or hidden according to its particular state of being tagged or being hidden at the time of the redraw event. Triggered events receive the next highest priority so that all triggered events which result from a single user event are allowed to play out and trigger other events until all triggered events are processed before the next user event. In other embodiments, user events are allowed to interrupt the triggered events, and redraw events are only permitted to occur after all triggered events from the last user input are processed.

As mentioned above, triggered events occur when an event matches a behavior which contains an action that causes a state change. The occurrence of the state change is itself an event. The state change may cause another action to occur which triggers yet another event. For example, if the action is the turning on of an object, then the object notifies its structure of that state change. If the structure is a switch and the action is the turning on of an object which was previously off, then if an object contained in the switch was on before the action, that object must be turned off. Turning off that object may, in turn, be an event for which a behavior is defined that includes another action which may change the state of another object. Special actions whose targets are stacks or switches may also trigger events. An action such as first, last, next, or previous directed to a target switch will change the current active object of the switch and therefore will change the state of that object. The state change of the object is an event that may cause the object to be displayed or otherwise changed and may also trigger other events. If the action is show or hide an object, then the object will be tagged as being shown or hidden and when the redraw occurs, the object will be appropriately handled. Showing or hiding the object causes the state of the object to change, and may impact the structure in which the object is contained.

Thus, a user input such as mouse event causes the applet to look up objects which contain behaviors that include the mouse event. In one embodiment, the efficiency of the applet's search is increased by first checking whether the mouse event occurred within the boundary of each group and only searching for objects contained in the groups in which the mouse event location is included. In one embodiment, the applet only searches visible objects which contain the mouse position. Once the objects which contain the position of the mouse are found, then the applet looks through the behaviors of all found objects and performs the actions which are defined in behaviors which are triggered by the particular mouse event which occurred. Those actions may cause events which trigger other actions and events.

Triggered events occur in the organizational chart example described in FIG. 3A and FIG. 3B. For example, suppose that the mouse is located in the region defined for the Robin group 314 and that the mouse button has already been clicked so that the Robin greeting is currently playing. For the purpose of this example it is assumed that all triggered events from the last user input have completely played out, that is, all actions which directly or indirectly result from the state changes have been performed by the applet. When the user moves the mouse from the Robin region to the Tom region, the applet looks up all visible objects or groups which correspond to the new mouse position. The Tom group is found, and the behavior which specifies that upon the mouse entering the Tom group region, the Tom annotation will be shown is triggered. The showing of the Tom annotation changes the state of the Tom annotation to "on" as a result of a one to one correspondence defined for being shown and being "on". The Tom annotation notifies the stack structure which is its container that it has changed state. This causes the Robin annotation to be turned off because only one member of a stack may be on at a given time. Turning the Robin annotation off causes the Robin annotation to be hidden.

Next, the user clicks on the Tom group region. This causes the play greeting action to be performed according to the behavior defined for the Tom group that a mouse click in the Tom group region causes the Tom greeting to be played. The playing of the Tom greeting causes the Tom greeting object to be turned on according to the behaviors defined in FIG. 3C which implement a one to one correspondence between the playing of the Tom greeting and the Tom greeting being on. Because the Tom greeting is part of the greeting switch, the greeting switch is notified that the state of the Tom greeting object has changed to on and the greeting switch therefore turns off the Robin greeting object since only one object within the greeting switch may be turned on at any given time. Turning off the Robin greeting causes the Robin greeting to stop playing according to the behavior defined for the Robin greeting that when the Robin greeting is turned off, the Robin sound stops playing.

Thus, by defining objects, placing objects in structures, and defining behaviors for the objects and structures, it is possible to cause a cascading set of actions to occur as the result of a single user input. By defining the objects, structures, and behaviors, a Web page designer is able to program relatively complex processes in an organized and concise fashion. The structures and objects with their defined behaviors and the Java applet are downloaded by the user who wishes to view or "play" the Web page and the complex cascade of actions which result from the user's input to the Web page display is implemented.

Figure 5A:
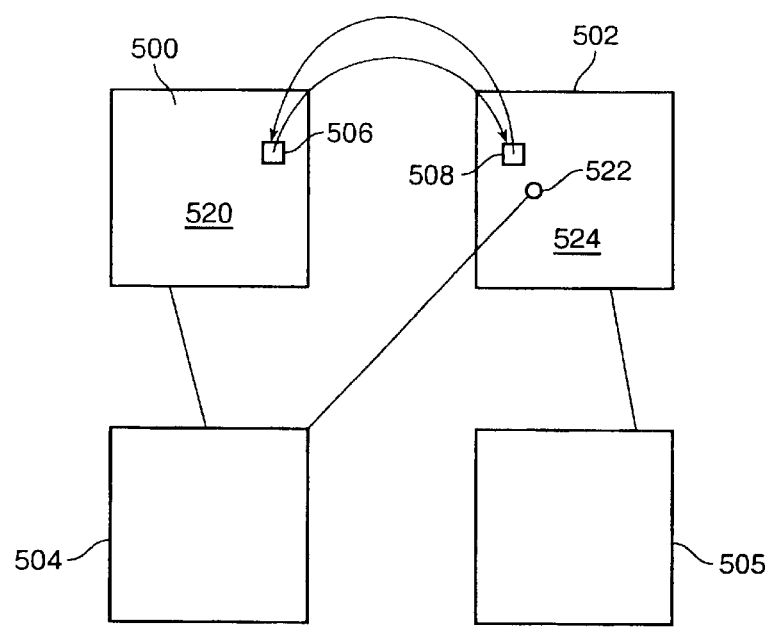
FIG. 5A shows the display process which occurs for a conventional set of Web pages.

FIG. 5A shows the display process which occurs for a conventional set of Web pages. Root page 500 and root page 502 both contain HTML information which is always displayed upon the display of the page which contains the information.

Figure 5B:
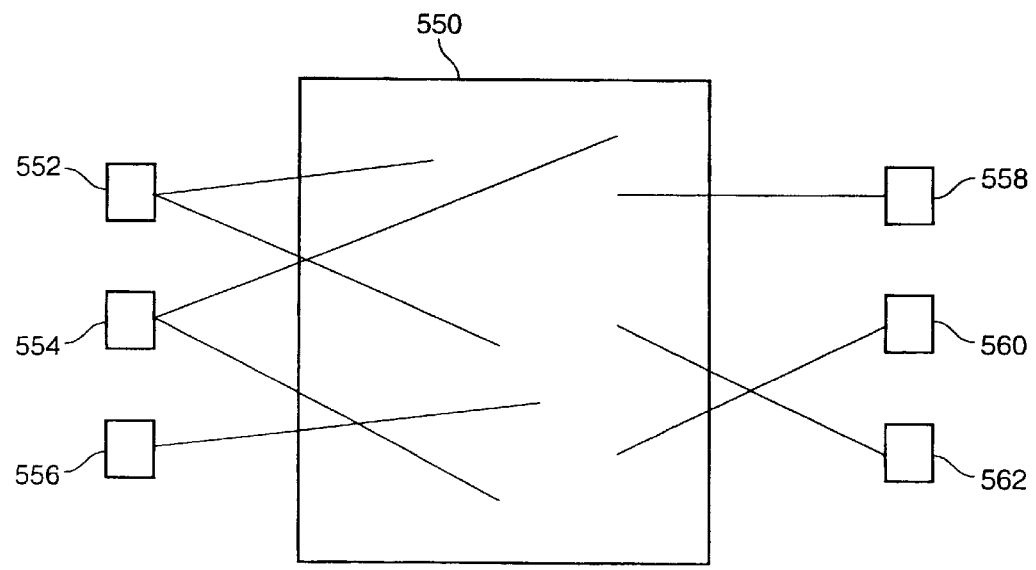
FIG. 5B shows the display process for the present invention.

Selection of link 506 causes root page 500 to be removed from the display and root page 502 to be displayed. Likewise, link 508 causes root page 500 to be displayed and root page 502 to be removed. Graphics object 504 and graphics object 505 are downloaded separately from root page 500 and root page 502 and are inserted in spaces 520, spaces 522, and spaces 524 which are left blank for the graphics objects. FIG. 5B shows the display process for the present invention. Page 550 is a single page which may interchangeably or simultaneously display object 552, object 554, object 556, object 558, object 560, and object 562. By displaying any and all combinations of the objects, Page 550 is able to display a large number of permutations of page displays, based on the user input.

Each of the objects may be displayed or hidden according to user input.

Furthermore, objects such as display objects 554 and display objects 552 may be displayed at a number of different locations. Objects may be freely rearranged to overlap other objects. Overlapped objects may be displayed partially obscured or may be hidden as a result of a state change. In certain embodiments, objects are moved on the screen by the user by dragging and dropping them arbitrarily on 550. All these operations occur without moving to a separate Web page via an HTML link. If an action is triggered which requires an object which is not included in the set object s which are initially downloaded, then that object is subsequently downloaded and dealt with according to the state of the system.

Figure 6:
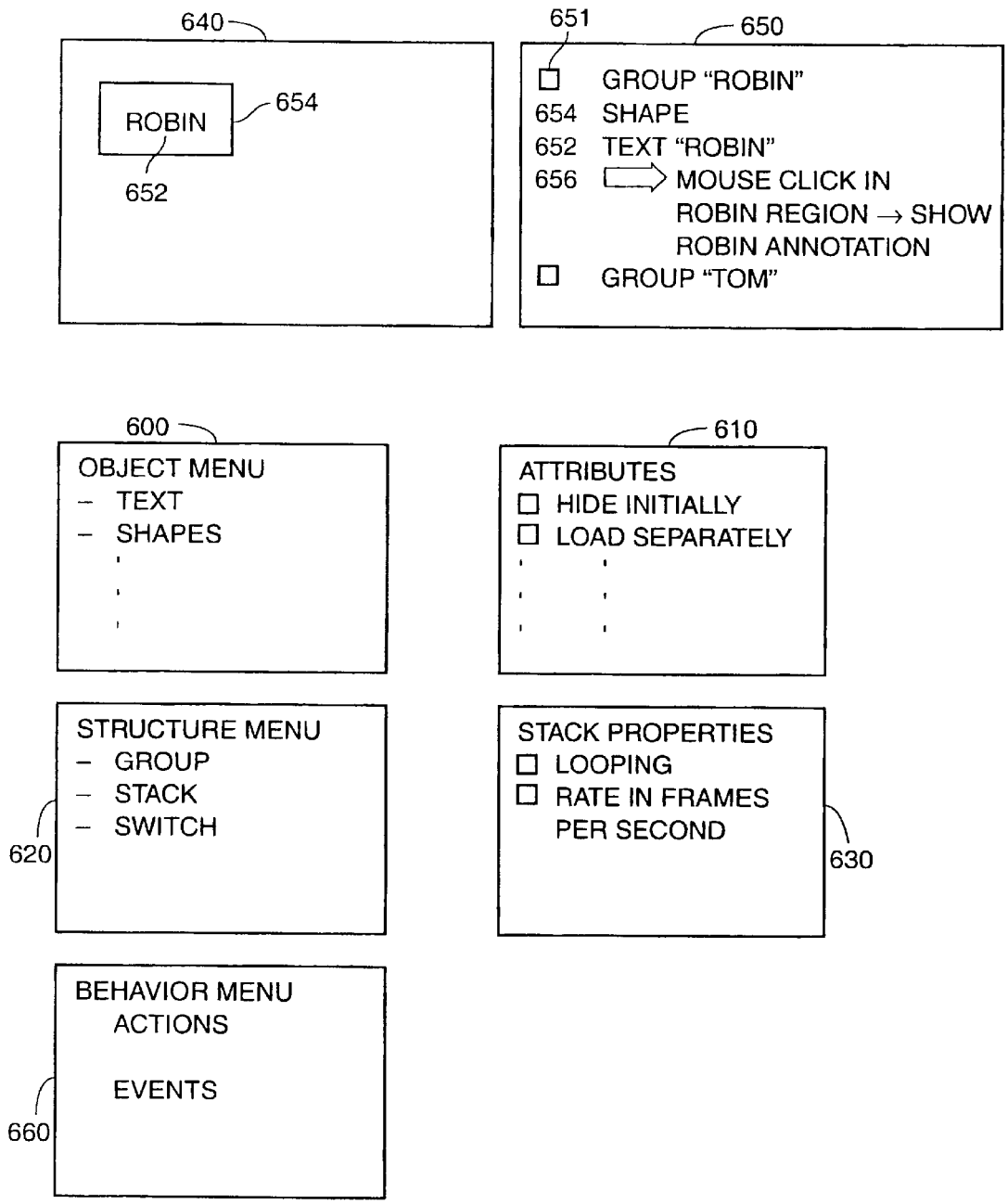
FIG. 6 illustrates how a user defines objects and groups to be included in an interactive Web page in one embodiment of the present invention.

FIG. 6 illustrates how a user defines objects and groups to be included in an interactive Web page in one embodiment of the present invention. A user desiring to create a Web page first selects an object from an object menu 600 which includes the various types of objects available to the user. These include text objects, shape objects, bit maps, clip art, sounds, buttons, check boxes, menus, and entry fields. In one embodiment, the user may also choose to import a document and convert it into an object suitable for display on an interactive Web page. For example, a Microsoft Word® document is converted in one embodiment to a series of objects with each page of the document defined as a group of drawing and text objects. The user may select as many objects as desired to include in an interactive Web page. As objects are selected, dialog box 610 appears so that the user may specify attributes of the object. In the embodiment shown, the user may choose, for example, whether to hide the selected object initially so that the object is not shown when the interactive Web page is initially accessed. The user also may choose whether the object will be downloaded separately from the rest of the objects on the interactive Web page only when activated by the user or whether the object will be loaded immediately when the page is accessed.

The user may also select structures in which to place objects from menu 620. Menu 620 includes the group, stack and switch list structures. In one embodiment, dialog box 630 appears to aid the user in defining the properties of the structures which are selected. In the embodiment shown, the user can decide whether to implement looping in a stack structure. Looping causes the stack to loop from the last element to the first element when the next command is received by the stack. If looping is not selected, then when a next command is received and the stack is at its last object, then a message is generated which states that the stack is already at its last element. The user also selects from menu dialog box 630 a rate in frames per second for the automatic display of the objects in the stack. This feature is used when the objects in the stack are displayed successively as in a slide show or animation. Flipping through the elements of the stack is referred to as "playing" the stack. Playing the stack causes the stack to automatically move to its next element after the current element's "duration" is finished. The stack may either stop or loop when it reaches the last element. Playing the stack can also be done in backwards order.

As the user selects objects and structures, the objects are displayed in an object view 640 according to the specified spatial location of the object. Objects and structures are also displayed in order according to their layering in a structure/object list 650. In one embodiment, the order of the structures and objects in structure/object list 650 determines the layer on which objects and structures are displayed. Objects and structures listed first are on the lowest layers. Objects and structures which occur later on the list are on higher layers and will be displayed on top of the objects on lower layers. Object view 640 and structure/object list 650 are linked so that selecting an object in either of the views finds the object in the other view as well. In one embodiment, drag and drop capability is implemented so that objects may be dragged from one list to another and objects may be dragged to behaviors to define targets for the behaviors.

The procedure for defining the organizational chart illustrated in FIG. 3A is described below. The user selects adding a group 651 from menu 620 and the group appears in structure/object list 650. The user assigns the group the name "Robin." Next, the user selects a text object 652 from object menu 600 and types in the text "Robin" and the user also selects a background color filler shape object 654 from object menu 600 to include in the Robin group and inserts shape object 654 before text object 652 so that it will appear as background for the text. Display objects 562 and shape object 654 are displayed in both object view 640 and structure/object list 650. Display objects 562 and shape object 654 may be positioned and resized on object view 640 by manipulating the mouse to drag, drop, and resize the objects. Display objects 562 and shape object 654 are placed inside group 651 by dragging them to group 651. Group 651, display objects 562 and shape object 654 may also be reordered in structure/object list 650 by dragging and dropping them among other objects and structures.

The user also defines a behavior for Robin group 651 by setting the event to mouse click, setting the action to show, and setting the target to be the Robin annotation. In one embodiment, behavior menu 660 is used to aid the user in selecting an event and an action for the behavior. Actions which may be selected include show, hide, toggle show/hide, play, stop, next previous, first and last. Events which may be selected include mouse events, object shown, object hidden, first, and last. The target is defined by selecting the target object during behavior definition or by dragging the target object to the behavior. The behavior is placed within group 651 by the user. Other behaviors are also defined for Robin group 651 as well and the remaining objects in the organizational chart are likewise defined until a complete list as the one shown in FIG. 3B is created.

The above description shows that it is possible to define objects and behaviors and to organize them into groups so that the objects are displayed or played interactively according to behaviors which respond to user input events. In one embodiment, individual objects are specified by the user, however, specifying every background object such as shape object 654 in each group in which it occurs can be a time consuming process. Therefore, the present invention also provides a system and method for defining prototypes which contain standard background or filler objects and which also contain a placeholder object that enables the placeholder to be attached to a user specified object so that objects and behaviors in the prototype are automatically conformed to the placeholder object and specified for the user.

Figure 7A:
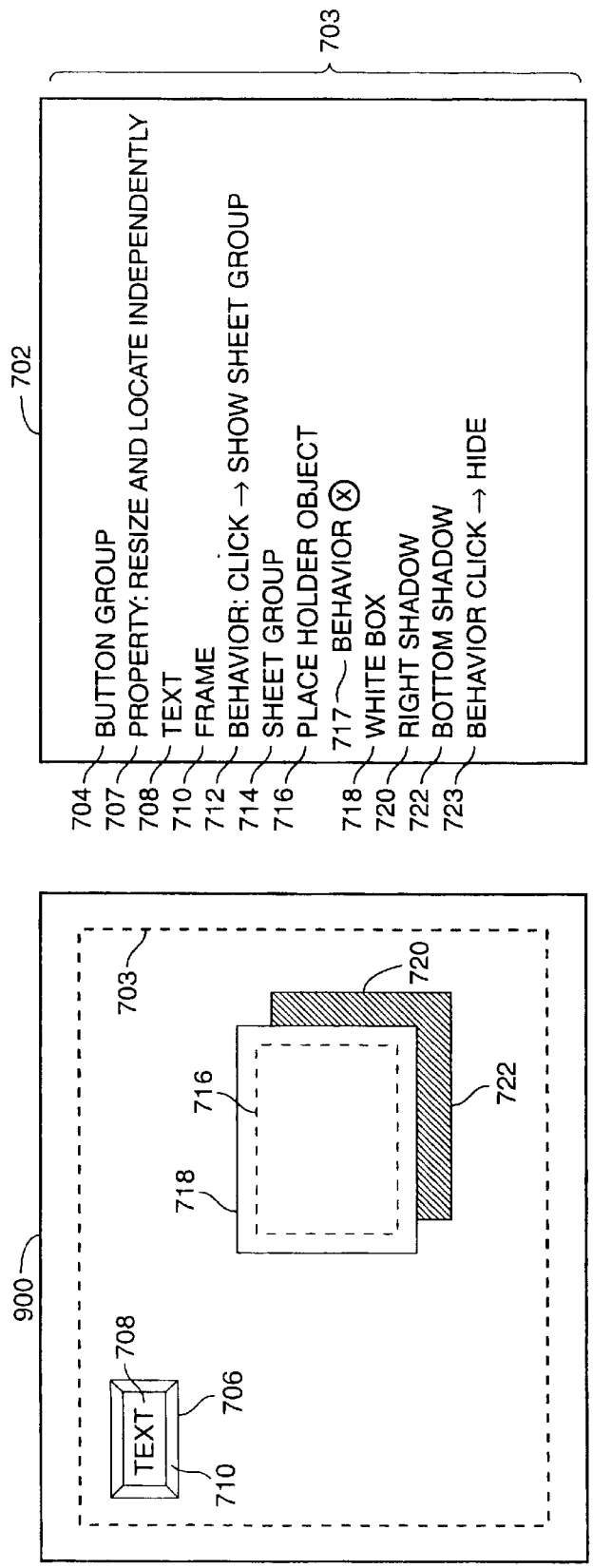
FIG. 7A illustrates a prototype which contains several groups and objects including a place holder object.

FIG. 7A illustrates a prototype which contains several groups and objects including a place holder object. An object view 700 and a hierarchical structured object list 702 are shown for a prototype 703. Each object and structure listed in the prototype is included in the interactive web page being created when the prototype is selected by the user. Some prototypes contain a placeholder object which is bound to a user specified object when the user attaches the prototype to the user specified object. The user specified object to which the prototype is attached is referred to as the "bound" object. When the prototype is attached to the bound object, then each object in the prototype is resized and relocated according to the size and position of the user specified object. In one embodiment, each object in a prototype has a default property that it is resized and relocated so that its new size and location is proportionally the same relative to the bound object as its old size and location was relative to the placeholder object. For example, a 1 unit by 1 unit object which is located 1 unit to the left of and one unit above the upper left edge of a 1 unit by 1 unit placeholder is resized to 2 units by 2 units and relocated to be 2 units above and 2 units to the left of the upper left edge of a 2 unit by 2 unit bound object.

Lock bits can be specified by the user to redefine the sizing and location properties of objects and structures so that they are not proportionally resized and relocated. For example, certain lock bits cause the size of an object to be defined absolutely so that its size and distance from the bound object is constant regardless of the size of the bound object. Lock bits used to override default sizing and location properties and their effect will be further described below. In other embodiments, default sizing and location properties other than proportional resizing and relocation are specified for the objects in a prototype.

Prototype 703 shown in FIG. 7A includes a button group 706. Button group 706 includes a property 707, a text object 708 and a frame object 710 which is a shape object. Text object 708 and frame object 710 are shown in object list 702 under button group 706 and are shown displayed as button group 706 in object view 700. Button group 706 also includes a behavior 712 that when a mouse click event occurs inside the button group, then a sheet group 714 is made visible or shown.

Property 707 is defined by a set of lock bits selected by the prototype creator to specify that the size and position of the objects in button group 706 does not change relative to the size and position of the bound object to which prototype 703 is attached. This is desirable for a button since the user is likely to want a standard size button, not a different size button for every different size bound object. Lock bits are also set so that the initial distance between the button and the bound object is absolutely defined when the prototype is initially attached to the bound object. Lock bits are also set so that after the prototype is attached to the bound object, further adjustment by the user of the position of the bound object does not also move the button. In other words, Lock bits are defined so that the button and the bound object may be moved independently of each other. Note that the properties of other structures and objects defined by lock bits are not shown in object list 702 for the sake of simplicity in the example list.

Sheet group 714 includes a place holder object 716. 716 has a behavior X 717 which is assigned to it and which is included along with any other behavior that belongs to an object which is bound to placeholder object 716. Behavior X could be any behavior, for example, behavior X could be the behavior, "when shown, play open sound." Sheet group 714 also includes a white box 718, a right shadow 720, and bottom shadow 722. Sheet group 714 also includes a behavior which specifies that in the event of a mouse click inside its borders, sheet group 714 is hidden. Placeholder object 716, white box 718, right shadow 720, and bottom shadow 722 are also shown in object view 700. Placeholder object 716 is shown as a dashed box because it has no appearance itself and exists only for the purpose of being bound to an object when prototype 703 is attached to an object.

As noted above, the various properties of the objects and structures listed in object list 702 specified by lock bits are not listed except for property 707 of button group 706. Each of the objects in sheet group 714, however, do contain such properties. White box 718 is intended to appear as a constant width border around the bound object when the bound object is bound to placeholder 716 and is displayed on top of white box 718. If white box 718 were resized proportionally to the bound object, then the width of the border on the sides would be different from the width of the border on the top and bottom if the aspect ratio of the bound object happens to be different from the aspect ratio of placeholder object 716. Lock bits are therefore specified for white box 718 which cause it to have a property which creates a constant border around the bound object, regardless of the size of the bound object. Similarly, right shadow 720 has lock bits which specify that its length is resized according to the height of the bound object, but its width is held constant and bottom shadow 722 has lock bits which specify that its length is resized according to the width of the bound object, but its height is held constant. Furthermore, the position of right shadow 720 is locked to the right edge of the bound object and the position of bottom shadow 722 is locked to the bottom edge of the bound object.

Figure 7B:
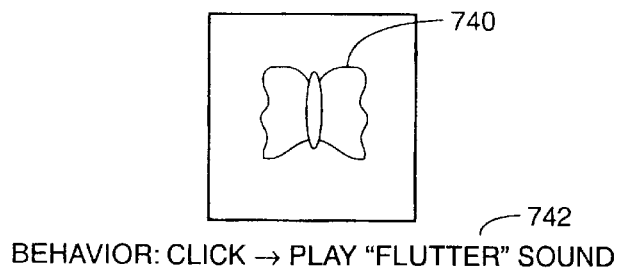
FIG. 7B illustrates a butterfly object, which is an image of a butterfly.

FIG. 7B illustrates a butterfly object 740, which is an image of a butterfly. Prototype 703 is attached to butterfly object 740 so that prototype 716 wraps around butterfly object 740 and butterfly object 740 is bound to placeholder 716. Butterfly object 740 includes a behavior 742 that upon the event of a mouse click, a flutter sound is played. Once the Web page author selects prototype 703 and attaches it to butterfly object 740, the Web page author may rearrange and resize the objects as desired. When butterfly object 740 moved or resized, then the objects contained in prototype 703 are moved and resized according to the lock bits which are defined for each object.

Figure 7C:
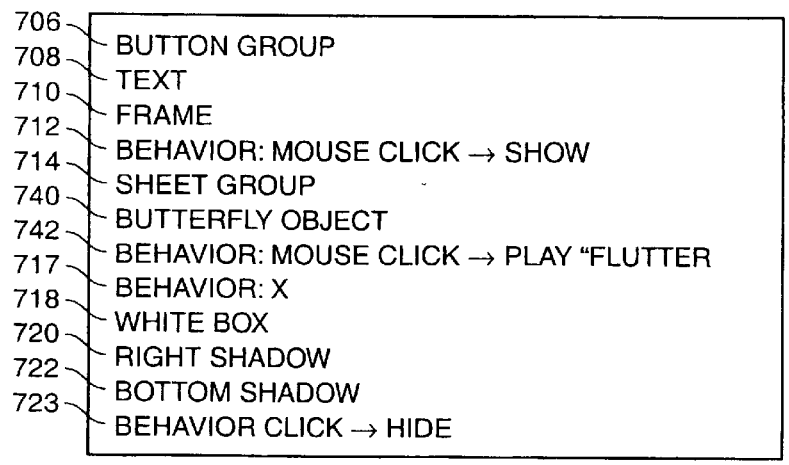
FIG. 7C illustrates the structure that is created for the interactive web page that is available for downloading by users as a result of the Web page author attaching the prototype shown in FIG. 7A to the butterfly object shown in FIG. 7B.

FIG. 7C illustrates the structure that is created for the interactive web page that is available for downloading by users as a result of the Web page author attaching prototype 703 shown in FIG. 7A to butterfly object 740 shown in FIG. 7B. The structure includes button group 706, text 708, frame 710, and behavior 712. Sheet group 714 is also included, but placeholder object 716 is replaced by butterfly object 740. Behavior 742 associated with butterfly object 740 has also been added so that in the event of a mouse click on butterfly object 740, the flutter sound is played. Note also that behavior X 717 from FIG. 7A is also listed under butterfly object 740. It is not replaced by behavior 742. White box 718, right shadow 720, and bottom shadow 722 are also included in the structure, as well as behavior 723.

Figure 7D:
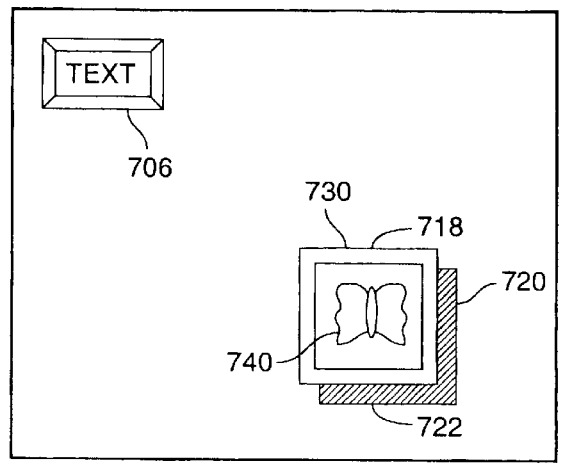
FIG. 7D illustrates the final result of the web page creator attaching a prototype to a bound object.

FIG. 7D illustrates the final result of the web page creator attaching prototype 703 to bound object 740. In this example, bound object 740 is smaller than placeholder 716. Button group 706 has not changed size or position, since it has the property that it is sized and positioned independently of the bound object. Note that the web page creator can also choose to arbitrarily move or size the button independently of the bound object. In this example, the web page creator left the button at its original location. White box 718, right shadow, 720, and bottom shadow 722 have been resized and repositioned to fit around bound object 740, which has been bound to placeholder 716. When the user of the interactive Web page clicks on button group 706, then sheet group 714, which includes bound object 740 is shown. When the user clicks on bound object 740, a flutter sound is played. Behavior X 717 is also included. For example, if Behavior X 717 was to hide self on a double mouse click, then a double mouse click within sheet group 714 would hide the group.

Figure 8A:
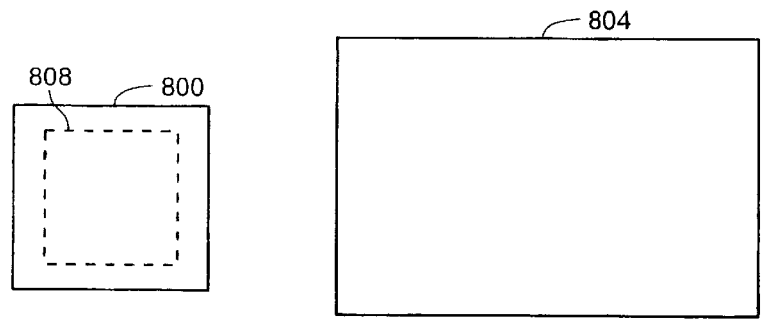
FIG. 8A, FIG. 8B, and FIG. 8C illustrate in detail how lock bits are defined for a white box which is layered below a placeholder object so that it appears as a constant border around a bound object when a prototype containing the white box and the placeholder object is attached to a bound object.
Figure 8B:
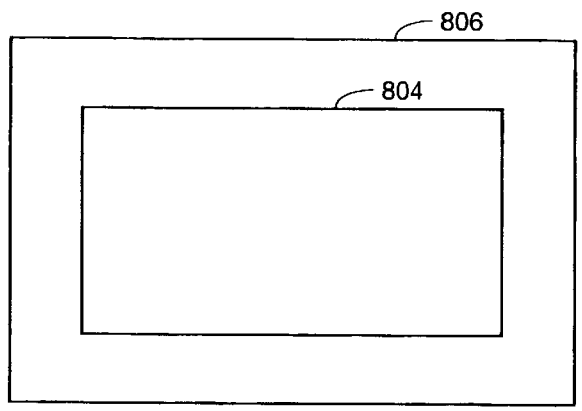
Figure 8C:
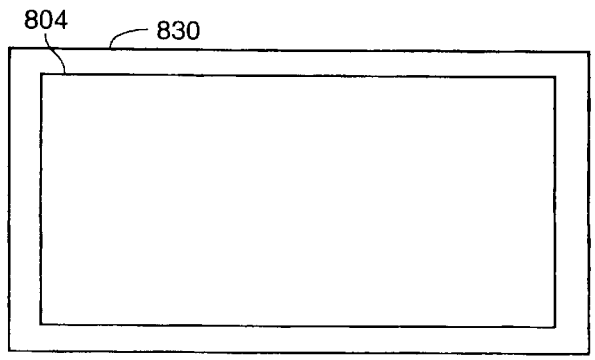

FIG. 8A, FIG. 8B, and FIG. 8C illustrate in detail how lock bits are defined for a white box 800 which is layered below placeholder object 802 so that it appears as a constant border around a bound object 804 when a prototype containing white box 800 and placeholder object 802 is attached to bound object 804. In FIG. 8A, placeholder object 802 is defined with a width and height of 4 units so that its aspect ratio is 1. White box 800 has a height of 6 units and a width of 6 units so that it creates a constant 1 unit border around placeholder object 802. Bound object 804 has a height of 8 units and a width of 12 units.

FIG. 8B illustrates the result if no lock bits are selected for white box 800 when 812 is bound to placeholder object 802 and the default resizing property of white box 800 is that it is proportionally resized. A resized white box 806 is created which has a height of 12 units and a width of 18 units. The size of the resulting border is changed and the top and bottom borders have a different width, 2 units, than the width of the right and left borders, 3 units.

FIG. 8C illustrates the lock bits which are defined to cause resized white box 830 to create a constant 1 unit border around bound object 804. Lock bit 812 is selected so that the position of the top edge of resized white box is locked relative to the top edge of bound object 804. Lock bit 814 is selected so that the position of the right edge of resized white box is locked relative to the right edge of bound object 804. Lock bit 818 is selected so that the position of the bottom edge of resized white box is locked relative to the bottom edge of bound object 804. Lock bit 820 is selected so that the position of the left edge of resized white box is locked relative to the left edge of bound object 804. Note that lock bit 822, which would lock the width of white box 800 at a constant value and lock bit 824, which would lock the height of white box 800 at a constant value are not set. Lock bit 822 and lock bit 824 would be set for an object such as a button which has a constant size regardless of the size of the bound object. In one embodiment, the lock bits are selected by the creator of the prototype and are completely transparent to the creator of the interactive Web page who attaches the prototype to an object. In other embodiments, the lock bits selected may be changed by the Web page creator.

Figure 9:
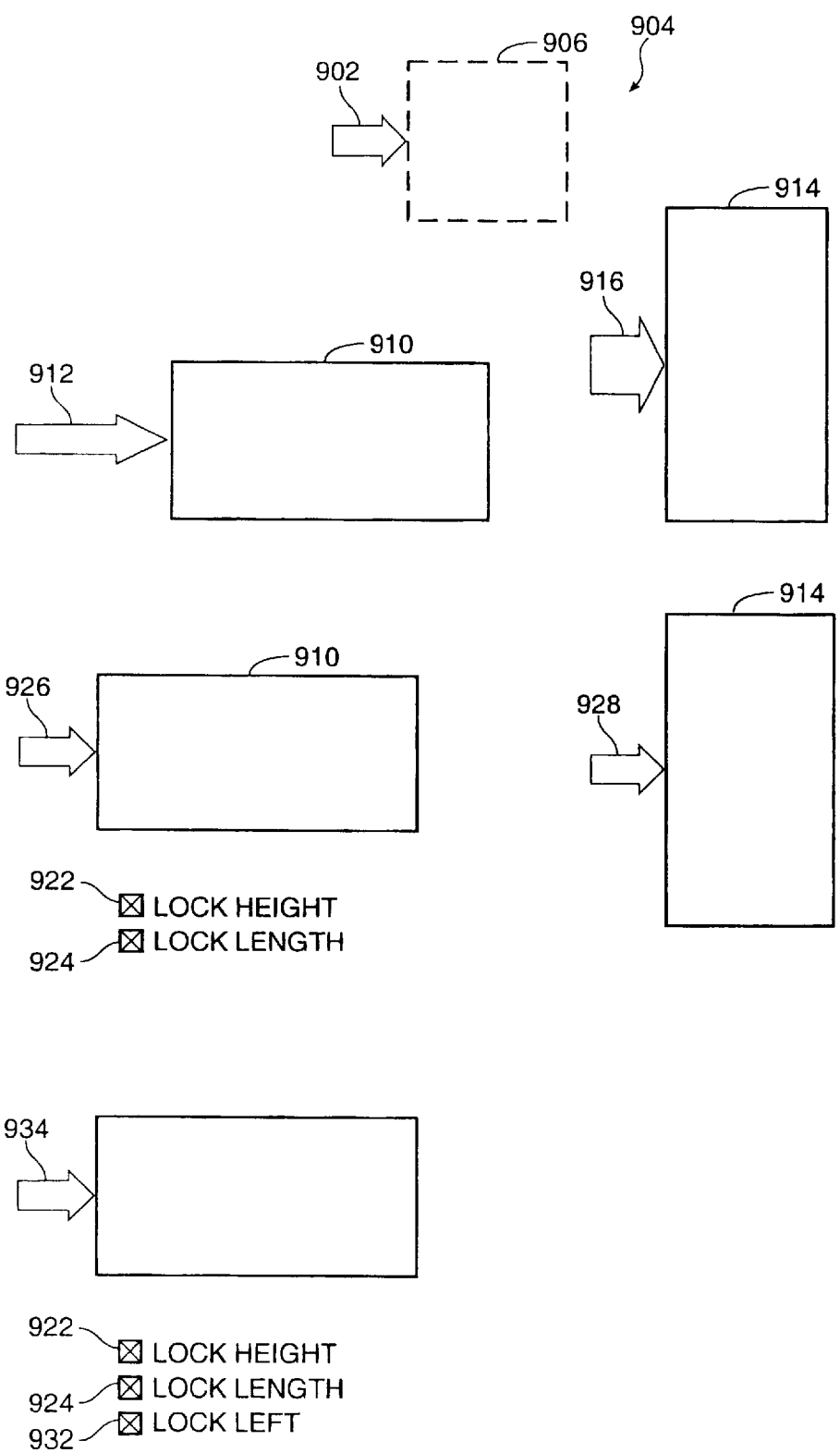
FIG. 9 illustrates how lock bits are specified to control the size and location of an object in a prototype when the prototype is attached to a bound object.

FIG. 9 illustrates how lock bits are specified to control the size and location of an object in a prototype when the prototype is attached to a bound object. An arrow object 902 is included in a prototype 904 along with a placeholder 906. If no lock bits are selected, then when prototype 904 is attached to an object 910 which has twice the length of placeholder 906, then a lengthened arrow 912 results. Likewise, when prototype 904 is attached to an object 914 which has twice the height of placeholder 906, then an arrow 916 which has twice the height of arrow object 902 results. Arrow 912 and arrow 916 are deformed because their aspect ratios have been changed from the aspect ratio of placeholder 906 to match the aspect ratios of their respective bound objects.

If a lock bit 922 is specified to lock the height of arrow object 902 and a lock bit 924 is specified to lock the length of arrow object 902, then a correctly sized arrow 926 is included with object 910 and a correctly sized arrow 928 is included with object 914.

However, arrow 926 appears spaced away from object 910 because the location of arrow 926 has been linearly transformed into a larger space. Lock bit 932 is specified to lock arrow object 902 to the left edge of any object which is bound to placeholder 906. When a lock bit 932 is specified, then a correctly spaced and correctly sized arrow 934 results.

Figure 10:
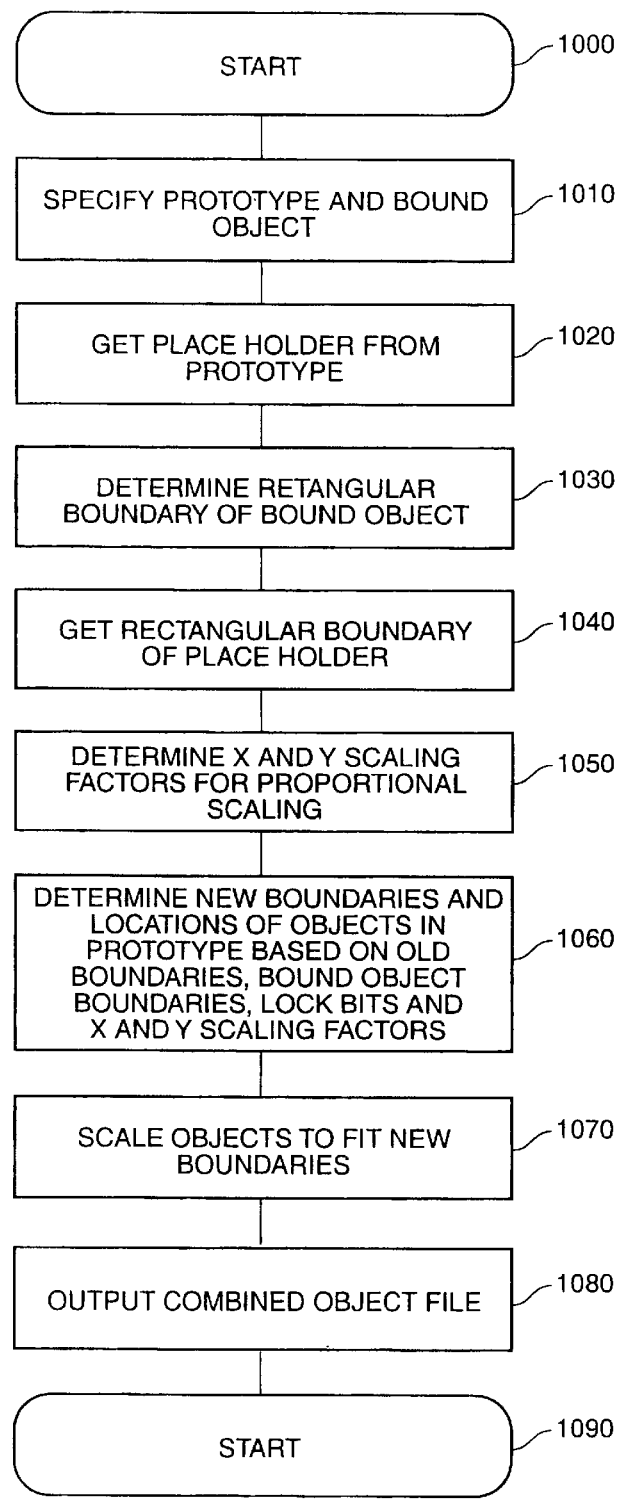
FIG. 10 is a flow diagram illustrating the process of applying a prototype to an object.

FIG. 10 is a flow diagram illustrating the process of applying a prototype to an object. The process starts in step 1000. In step 1010, the user specifies the prototype and the bound object. In step 1020, the placeholder is retrieved from the prototype. In step 1030, the rectangular boundary of the bound object is determined. The rectangular boundary of the placeholder is determined in step 1040. X and Y scaling factors are calculated in step 1050 for proportionally scaling objects according to the ratio of the heights (Y scaling factor) and the widths (X scaling factor) of the bound object and the placeholder. In step 1060, new boundaries are determined for each object in the prototype. The new boundaries and location of each object are determined based on the old boundaries and location of the object, the boundaries of the bound object, the state of the lock bits and the X and Y scaling factors calculated in step 1050. The lock bits override the proportionally scaled boundaries which are determined using the X and Y scaling factors. The lock bits lock certain boundaries of objects relative to certain boundaries of the placeholder or cause certain object sizes to be absolutely maintained. In step 1070, the objects are scaled to fit the new boundaries. In step 1080, a file which represents the combination of the bound object with the prototype is output. The process ends at 1090.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. It is therefore intended that the following appended claims be interpreted as including all such alterations, permutations, and equivalents as fall within the spirit and scope of the present invention.

What is claimed is:

1. A computer-implemented method for creating an interactive web page, the method comprising:

defining a plurality of objects which are configured to have associated states, said associated states including a visible state and a hidden state wherein an object in the visible state is displayed and object in the hidden state is not displayed;

associating a subset of objects from said plurality of objects together in a structure so that said state of a first object within said structure is dependent on said states of other objects within said structure;

placing said plurality of objects and said structures into an hierarchy in a way which causes certain objects and structures in said hierarchy to be layered on top of other objects and structures in said hierarchy;

associating behaviors with said objects, each behavior being associated with one of said plurality of objects and including an associated event, and an associated action, wherein each behavior is arranged so that when the associated event occurs, the associated action is performed on the associated object, and wherein the performance of the action on the object changes the state of the object, and wherein said change of state of said object is a second event; and providing an event processor which is configured to process said events as they occur and adjust said states of said objects according to said events and said behaviors associated with said objects so that said objects are caused to be displayed or hidden on said web page in accordance with said behaviors and said events.

2. A method of creating an interactive web page as recited in claim 1 wherein the structure is a group and wherein the objects in the group are all in either the visible state or the hidden state.

3. A method of creating an interactive web page as recited in claim 1 wherein only one object is in the visible state at a time.

4. A method of creating an interactive web page as recited in claim 1 wherein the objects are positioned in a predefined order and all objects after a selected object are displayed.

5. A method of creating an interactive web page as recited in claim 1 wherein the structure is a stack having an order and objects are successively displayed in the order of the stack.

6. A method of creating an interactive web page as recited in claim 1 wherein the plurality of objects comprise a prototype.

7. A method of creating an interactive web page as recited in claim 6 wherein the objects in the prototype may be resized together.

8. A method of creating an interactive web page as recited in claim 7 wherein only a portion of the objects within the prototype are resized together.

9. A computer-implemented method for creating an interactive web page comprising:

defining a plurality of objects which are configured to have associated states;

associating a subset of objects from said plurality of objects together in a structure so that said state of a first object within said structure is dependent on said states of other objects within said structure;

associating behaviors with said objects, each behavior including an associated event, an associated action, and an associated target object, wherein each behavior is arranged so that when the associated event occurs, the associated action is performed on the associated target object, and wherein the performance of the action on the target object changes the state of the target object, and wherein said change of state of said target object is a second event; and providing an event processor which is configured to process said events as they occur and adjust said states of said objects according to said events and said behaviors associated with said objects so that said objects are displayed or hidden on said web page in accordance with said behaviors and said events.

10. A computer-implemented method for creating an interactive web page comprising:

defining a plurality of objects which are configured to have associated states;

associating behaviors with said objects, each behavior including an associated event, an associated action, and an associated target object, wherein each behavior is arranged so that when the associated event occurs, the associated action is performed on the associated target object, and wherein the performance of the action on the target object changes the state of the target object, and wherein said change of state of said target object is a second event; and providing an event processor which is configured to process said events as they occur and adjust said states of said objects according to said events and said behaviors associated with said objects so that said objects are displayed or hidden on said web page in accordance with said behaviors and said events.

11. A computer-implemented method for creating an interactive web page comprising:

defining a plurality of objects which are switchable between a first state and a second state, said plurality of objects being linked together such that a state of one of said plurality of objects is dependent on a state of other of said objects;

associating a behavior with each of said plurality of objects, each behavior having an associated event and an associated action, wherein each behavior is arranged such that when the associated event occurs, the associated action is performed on the associated object, and wherein the performance of the action on the object changes the state of the object; and providing an event processor configured to process said events as they occur and adjust the states of the associated object according to the associated behavior.

12. A method of creating an interactive web page as recited in claim 11 wherein defining a plurality of objects comprises defining a plurality of objects within a single web page.

13. A method of creating an interactive web page as recited in claim 12 wherein the object is displayed in the first state and hidden and the second state.

14. A method of creating an interactive web page as recited in claim 12 wherein each of said plurality of objects is an image.

15. A method of creating an interactive web page as recited in claim 14 wherein the associated action is displaying or hiding the image.

16. A method of creating an interactive web page as recited in claim 12 wherein each of said plurality of objects is a sound.

17. A method of creating an interactive web page as recited in claim 16 wherein the associated action is playing the sound.

18. A method of creating an interactive web page as recited in claim 12 wherein the objects are configured to be movable relative to one another by a user of the web page.

19. A computer-implemented method for creating an interactive web page the method comprising:

defining a plurality of objects which are configured to have associated states, said associated states including a visible state and a hidden state wherein an object in the visible state is displayed and object in the hidden state is not displayed;

associating a subset of objects from said plurality of objects together in a structure so that said state of a first object within said structure is dependent on said states of other objects within said structure;

placing said plurality of objects and said structures into an hierarchy in a way which causes certain objects and structures in said hierarchy to be layered on top of other objects and structures in said hierarchy;

linking each object to a target object and associating each target object with an associated event and an associated action, wherein when the associated event occurs, the associated action is performed on the target object, and wherein the performance of the action on the target object changes the state of the linked object, and wherein said change of state of said object is a second event;

processing said events as they occur and adjusting said states of said objects according to said events and said behaviors associated with said objects; and displaying or hiding said objects on said web page in accordance with said behaviors and said events.

* * * * *